(12) United States Patent
Varma

(10) Patent No.: US 8,407,146 B2
(45) Date of Patent: Mar. 26, 2013

(54) SECURE STORAGE

(75) Inventor: Ankur Varma, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 1731 days.

(21) Appl. No.: 11/263,658

(22) Filed: Oct. 28, 2005

(65) Prior Publication Data

US 2007/0100756 A1    May 3, 2007

(51) Int. Cl.
*G06Q 99/00*    (2006.01)
(52) U.S. Cl. .................. 705/51; 705/50; 705/59
(58) Field of Classification Search .......... 705/51, 705/50, 59
See application file for complete search history.

(56) References Cited

U.S. PATENT DOCUMENTS

| | | | | |
|---|---|---|---|---|
| 5,568,552 | A * | 10/1996 | Davis .................. | 705/59 |
| 6,222,924 | B1 * | 4/2001 | Salomaki .................. | 380/200 |
| 6,606,707 | B1 * | 8/2003 | Hirota et al. .................. | 713/172 |
| 6,658,202 | B1 * | 12/2003 | Battaglia et al. .................. | 386/231 |
| 6,714,921 | B2 * | 3/2004 | Stefik et al. .................. | 705/55 |
| 7,174,320 | B2 * | 2/2007 | Rothrock .................. | 705/58 |
| 7,266,845 | B2 * | 9/2007 | Hypponen .................. | 726/24 |
| 7,356,575 | B1 * | 4/2008 | Shapiro .................. | 709/220 |
| 7,945,934 | B2 * | 5/2011 | Margis et al. .................. | 725/75 |
| 7,987,510 | B2 * | 7/2011 | Kocher et al. .................. | 726/27 |
| 2002/0146237 | A1 * | 10/2002 | Safadi .................. | 386/94 |
| 2003/0226012 | A1 | 12/2003 | Asokan et al. .................. | 713/156 |
| 2003/0236978 | A1 | 12/2003 | Evans et al. .................. | 713/164 |
| 2004/0003271 | A1 | 1/2004 | Bourne et al. .................. | 713/193 |
| 2004/0260740 | A1 | 12/2004 | Liu .................. | 708/490 |
| 2004/0260923 | A1 | 12/2004 | Nakai et al. .................. | 713/165 |
| 2005/0021948 | A1 | 1/2005 | Kamperman .................. | 713/165 |
| 2005/0055556 | A1 | 3/2005 | Shiu et al. .................. | 713/182 |
| 2005/0091491 | A1 | 4/2005 | Lee et al. .................. | 713/167 |

(Continued)

FOREIGN PATENT DOCUMENTS

| | | | |
|---|---|---|---|
| EP | 1526433 A1 | * | 4/2005 |
| EP | 1 538 619 A1 | | 6/2005 |

(Continued)

OTHER PUBLICATIONS

Fryer, Kim, Maureen Williams Zimmerman, Anne Taussig, Dail Magee Jr., Gary Nelson, Jean Ross, Jim Fuchs, John Conrow, Kurt Meyer, Robert Lyon, and Roslyn Lutsch, Editors, Microsoft Press Computer Dictionary 3rd Edition, 1997, Microsoft Press, Redmond, Washington, 3rd Edition, p. 430.* DRM Specification Candidate Version 2.0—Jul. 16, 2004, Open Mobile Alliance OMA-DRM-DRM-V2_0-20040716-C, 144 pages.*

(Continued)

*Primary Examiner* — James D Nigh
(74) *Attorney, Agent, or Firm* — Woodcock Washburn LLP

(57) ABSTRACT

A portable secure storage device provides a means to transport media from one media player to another while maintaining the security of and the rights associated with the content stored in the portable secure storage device. The device contains a security engine for managing digital rights associated with content stored in the device. The device can also include a hard disk drive memory and a real time clock. The hard disk drive memory provides ample storage of media and versatility of digital rights management. The real time clock maintains secure time. The device can be use to provide a thumbnail, a snapshot, a trailer version, or a table of contents of contents stored therein based on the security level of the receiving device. The portable secure storage device can query the receiving device to determine the current status of rights and can provide content in accordance with current rights.

20 Claims, 4 Drawing Sheets

U.S. PATENT DOCUMENTS

| | | | |
|---|---|---|---|
| 2005/0091507 A1* | 4/2005 | Lee et al. .................. 713/182 |
| 2005/0091508 A1* | 4/2005 | Lee et al. .................. 713/182 |
| 2005/0125357 A1 | 6/2005 | Saadat et al. ................ 705/57 |
| 2005/0125698 A1 | 6/2005 | Yeats et al. ................ 713/202 |
| 2005/0129246 A1 | 6/2005 | Gearhart .................... 380/278 |
| 2005/0144468 A1 | 6/2005 | Northcutt et al. ........... 713/189 |
| 2005/0210236 A1* | 9/2005 | Lee et al. .................. 713/153 |
| 2005/0210279 A1* | 9/2005 | Lee et al. .................. 713/194 |
| 2005/0216739 A1* | 9/2005 | Lee et al. .................. 713/168 |
| 2005/0246724 A1* | 11/2005 | Foehr et al. ................ 719/321 |
| 2006/0047957 A1* | 3/2006 | Helms et al. ............... 713/165 |
| 2007/0288715 A1* | 12/2007 | Boswell et al. ............. 711/164 |
| 2008/0016342 A1* | 1/2008 | Shimada et al. ............ 713/166 |

FOREIGN PATENT DOCUMENTS

| | | |
|---|---|---|
| WO | WO 02/091146 A2 | 11/2002 |
| WO | WO03/036441 A2 * | 5/2003 |
| WO | WO 2005/050450 A1 | 6/2005 |
| WO | WO 2005091163 A1 * | 9/2005 |

OTHER PUBLICATIONS

Tokmakoff et al. ("Home Media Server Content Management", Proceedings of SPIE vol. 4519 (2001), pp. 168-179).*

"Software Security that Works", Crypkey Software Copy Protection & License Control since 1992, http://www.crypkey.com/index.asp, 1 page.

"Software Protection and License Management Solutions", Software Protection, Software Licensing with HASP Hardware Key, http://www.aladdin.com/hasp/default.asp, 2 pages.

"Options for Multimedia, Broadcast, and Connectivity", http://www.semiconductors.philips.com/acrobat_download/literature/9397/75014071.pdf, 8 pages.

"M-Systems' Fortress Security Division and Emblaze Semiconductor Enter into a Cooperation Agreement to Develop Embedded Security Multimedia Processors for the Mobile Market", http://www.m-sys.com/site/en-US/Corporate/PressRoom/PressRelease/2004/PR03312004.htm, 3 pages.

* cited by examiner

SECURE STORAGE

TECHNICAL FIELD

The technical field generally relates to storage devices and more specifically relates to storage devices having the capability to manage digital rights associated with content stored in the device.

BACKGROUND

Many media players are capable of playing media that have attached digital rights. For example, it is possible to download a song, for a fee, from the Internet to a particular media player. Typically, the song can be played on the particular media player and is not transferable to another media player. This interoperability can be inconvenient if the media player to which the media were downloaded is not the preferred media player to listen to the music. One could download music to a small MP3 player for example, but not be able to listen to the downloaded music on a home entertainment system. Typical media players make concessions to accommodate both memory to store media and electronics to render media. That is, typical media players, particularly portable media players, reduce the amount of memory in the media player to allow room for other electronics, and relinquish the sophistication of the electronics to allow room for memory to store media.

SUMMARY

A portable secure storage device provides a means for managing digital rights associated with content (e.g., media) stored therein and providing content to intended hosts (e.g., media players) in accordance with respective digital rights. The portable secure storage device is capable of functioning as a secure host, capable of providing updates to intended recipients and receiving updates to content and digital rights. The secure storage device contains a security engine capable of managing digital rights associated with content stored therein. In an exemplary embodiment, the secure security device includes a hard disk drive memory allowing for ample storage of media and versatility of digital rights management. The secure storage device is capable of querying the intended recipient host to determine the current status of rights associated with content and that host, and can provide content in accordance with current rights. The portable secure storage device provides a means to transport media and the media associated digital rights from one media player to another while maintaining the security of the content stored in the secure storage device.

BRIEF DESCRIPTION OF THE DRAWINGS

The foregoing and other objects, aspects and advantages will be better understood from the following detailed description with reference to the drawings, in which.

DETAILED DESCRIPTION OF ILLUSTRATIVE EMBODIMENTS

A secure storage device contains a security engine capable of managing digital rights associated with content stored in memory of the secure storage device. The secure storage device is capable of providing at least a portion of the content stored therein in accordance with rights associated with the portion. The secure storage device is a smart device in that it is more than a passive storage device. The secure storage device can be updated to counter threats, attacks, and malicious acts against the content. The secure storage device can query an external source, such as a host (e.g., a media player), to obtain information pertaining to the host's rights associated with the content before providing the content (or a portion thereof) to the host. This information can include, for example, cryptographic keys for encrypting and decrypting portions of the content stored in the secure storage device, and/or permissible time periods associated with assigned rights.

In an exemplary embodiment, the secure storage device comprises a real time clock. The real time clock can be used to determine if a subscription or rental period for use of the content stored in the secure storage device has expired or is still in effect. The secure storage device can provide to a host selected portions of content stored in the secure storage device based on rights associated with the host and/or the security level associated with the host. For example, the secure storage device can provide to the host a trailer version, thumbnails, or snapshots of multimedia content in accordance with the security level assigned to the host/content. Further, the secure storage device can provide various resolutions of content (e.g., high definition video or low resolution video), in accordance with the security level assigned to the host.

In an exemplary embodiment, the secure storage device acts as a license server, therein enabling copying of contents in the secure storage device in accordance with digital rights management (DRM) rules. For example, the secure storage device can encrypt content stored therein using cryptographic keys specific to the host. License rules can include permission to copy contents from the secure storage device a predetermined number of times, the ability to created sub-licenses, or a combination thereof, for example.

Figure 1:
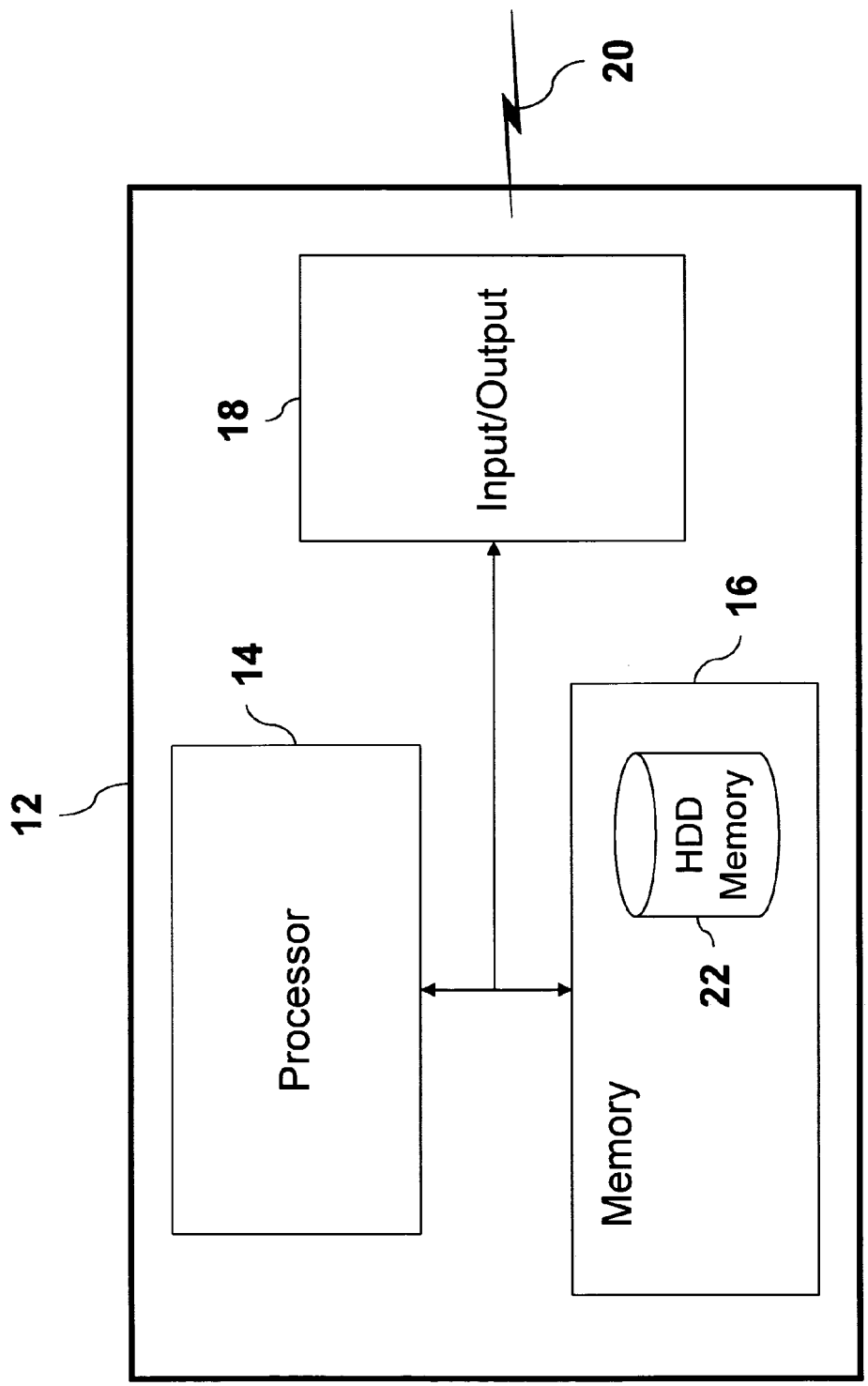
FIG. 1 is block diagram of a secure storage device.

FIG. 1 is block diagram of a secure storage device 12 comprising a processing portion 14, a memory portion 16, and an input/output portion 18. The secure storage device 12 can include any appropriate secure storage device such as a dedicated secure storage device, a personnel digital assistant (PDA), a cell phone, a mobile phone, a smart phone, or a combination thereof, for example. In an exemplary embodiment, the secure storage device 12 is separate from a media player, the secure storage device 12 is not capable of rendering media content, and the secure storage device 12 is portable. It is this exemplary embodiment that is described herein. In the exemplary embodiment wherein the portable secure storage device 12 is separate from the media player, the secure storage device 12 can comprise various configurations. For example, the secure storage device 12 can be in the form of relatively small hand held device, such as a cartridge or dongle. It is envisioned that the portable secure storage device 12 is small enough to be carried in a pocket or purse, or clipped onto a belt. This small hand held embodiment provides to a user a means for carrying secure content that can be played on any of a variety of players.

The processor portion 14 performs various functions for the secure storage device 12. The processing portion 14 manages rights associated with content stored in the memory portion 16. The content of the memory portion 16 can comprise any appropriate content. For example, content can include audio information, video information, graphic information, multimedia information, and computer data. The processing portion 14 determines which portions of content stored in the memory portion 16 are authorized to be provided to an external device, such as a host media player for example, via the input/output portion 18. The processor portion 14 utilizes the rights associated with respective portions of the content to determine which portions of content are authorized to be provided to a host.

The memory portion 16 stores content and an indication of the rights associated with portions of the content. The memory portion 16 can comprise any appropriate type of memory such as flash ROM (Read Only Memory), RAM (Random Access Memory), volatile memory, non-volatile memory, semiconductor memory, magnetic memory, removable memory, non-removable memory, or a combination thereof for example. In an exemplary embodiment, the memory portion 16 comprises hard disk drive memory 22. The hard disk drive memory 22 can comprise any appropriate memory implemented on a hard disk drive. Examples of appropriate hard disk drive memory 22 include the following commercially available products: a 0.85 inch hard disk drive memory, a 1 inch hard disk drive memory, a 1.8 inch hard disk drive memory, a 2.5 inch hard disk drive memory, and a 3.5 inch hard disk drive memory.

The input/output portion 18 of the secure storage device 12 is capable of providing coupling to any appropriate device, such as a peripheral, a host, and/or network, for example. The input/output portion 18 can comprise a port for hard wired coupling, a port for wireless coupling, or a combination thereof. In an exemplary embodiment, the input/output portion 18 comprises Universal Serial Bus (USB) compatible port. The input/output portion 18 provides and receives information via interface 20. The interface 20 can comprise any appropriate interface such as a wireless interface (e.g., rf, optical, cellular, wireless broadband etc), a wired interface (e.g., hard-wired, docking station, USB compatible interface), or a combination thereof.

Figure 2:
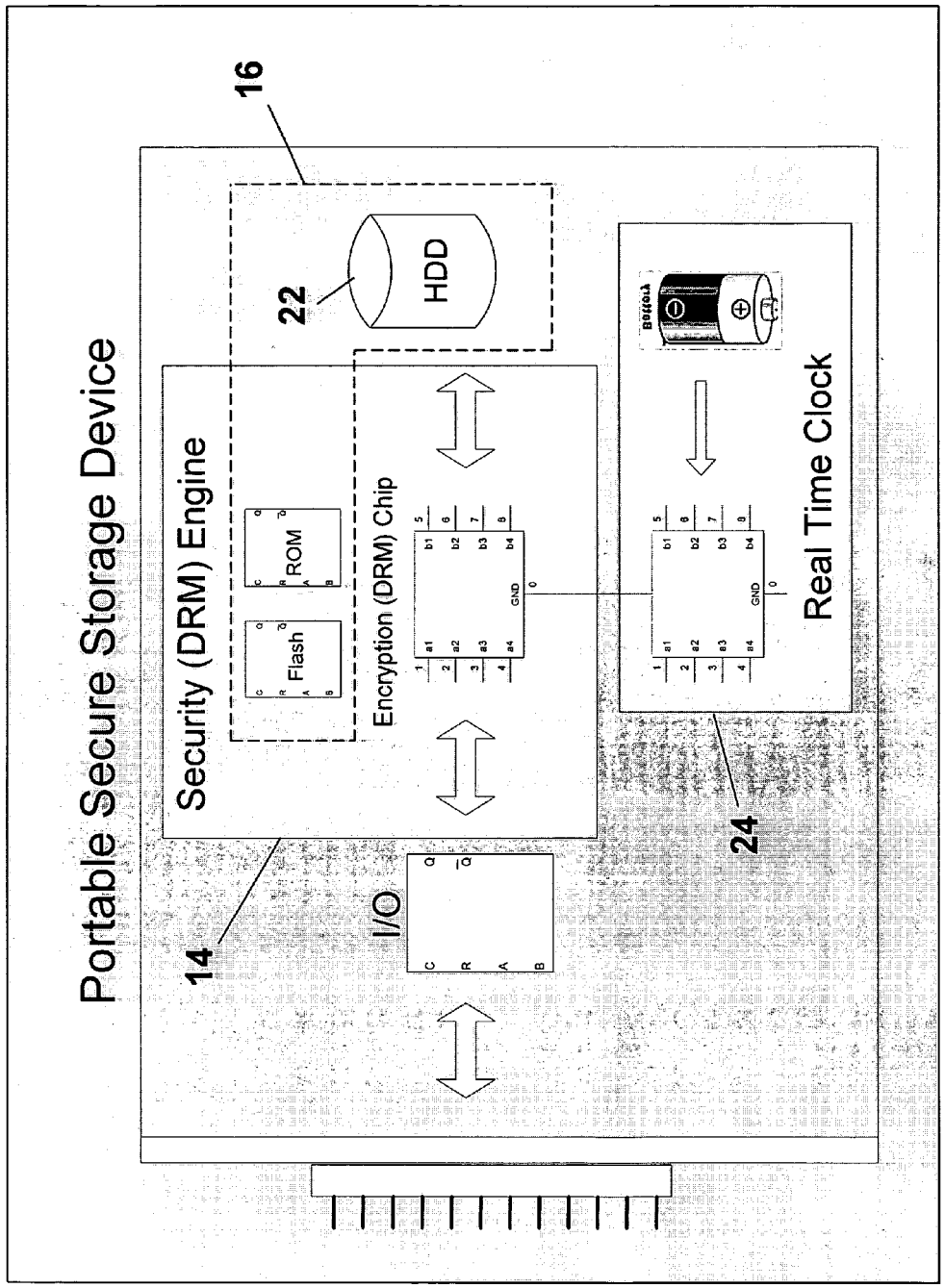
FIG. 2 depicts an exemplary configuration of the secure storage device.

FIG. 2 depicts an exemplary configuration of the secure storage device 12. The exemplary configuration shown in FIG. 2 includes a real time clock 24. The real time clock 24 is used to determine if a right associated with a portion of content has expired or if the right is currently in effect. Also as depicted in the exemplary configuration of FIG. 2, the processing portion 14 performs the function of a security engine implementing and managing digital rights (referred to as digital rights management, DRM) associated with the content stored in the memory portion 16. The processing portion 14 also can provide secure storage of content by encrypting content stored in the memory portion 14 and decrypting the encrypted content in accordance with respective rights associated therewith. The battery backup depicted in FIG. 2 is optional.

Figure 3:
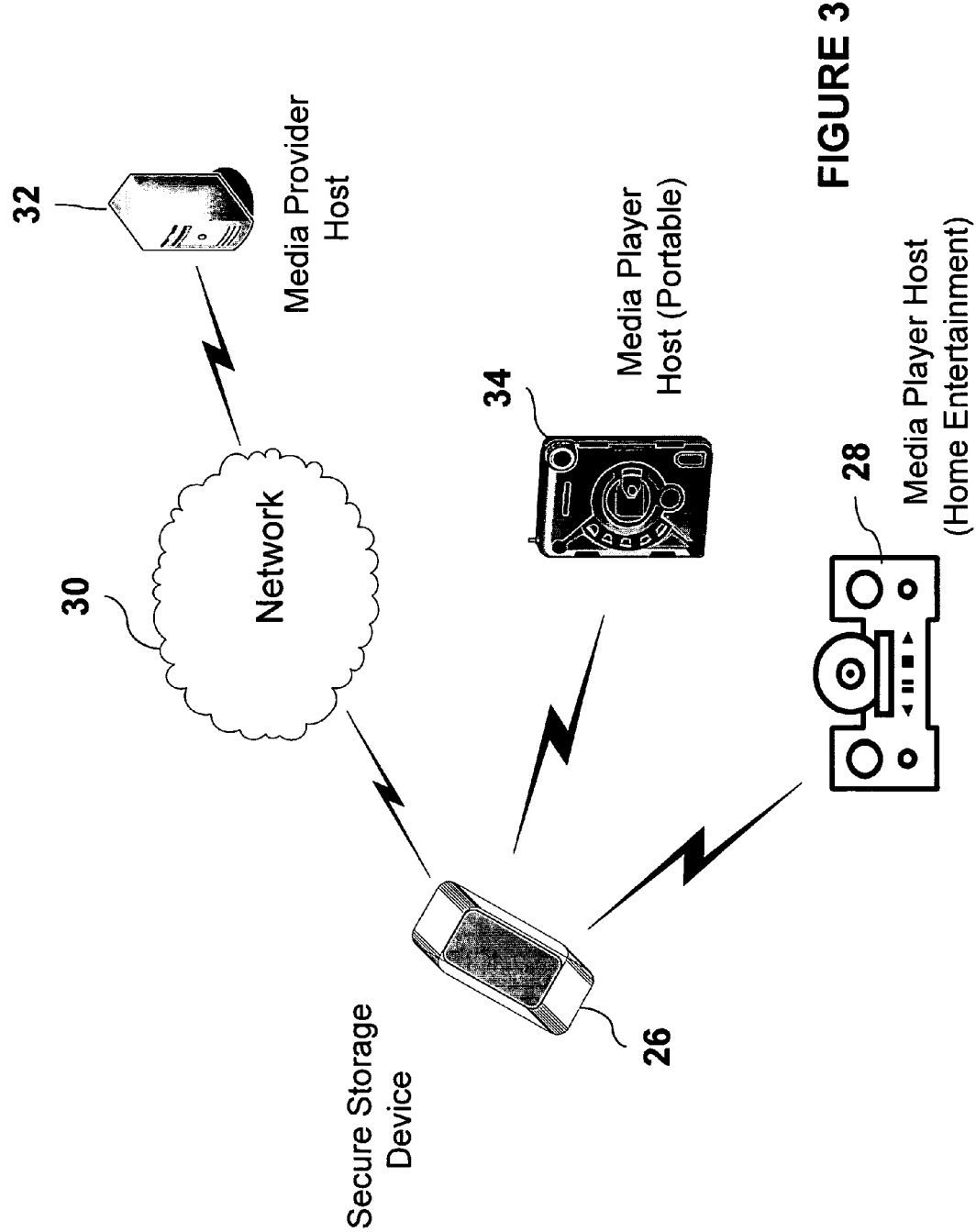
FIG. 3 is a diagram depicting an exemplary scenario involving the secure storage device, a media provider host, and media players.

FIG. 3 depicts an exemplary scenario involving the secure storage device 26, a media provider host 32, a media player 28, and another media player 34. In the exemplary scenario depicted in FIG. 3, the media provider host 32 provides media (e.g., an album of songs) to the secure storage device 26. The media provider host 32 also provides rights associated with the media to the secure storage device 26. For example, the media provider host 32 can provide an album of songs to the secure storage device 26, wherein the songs can be accessed from the secure storage device 26 for 24 hours from the time the songs are downloaded. Accordingly, the secure storage device 26 can transfer, for rendering, the songs to any appropriate host device in accordance with the rights associated with the songs. That is, the secure storage device 26 can transfer, for rendering, the songs to any media player for 24 hours. A host device can comprise any appropriate device capable of receiving and/or providing information. For example, a host device can comprise a DVD player, a CD player, a cassette player, a radio, a home entertainment center, a portable media player, an automobile radio, a computer, or a combination thereof, for example. Two host player devices are depicted in FIG. 3: a home entertainment media player host 28 and a portable media player host 34.

The media provider host 32 provides media to the secure storage device 26 via network 30. The network 30 represents any of a wide variety of networks. The network 30 can include public portions (e.g., the Internet) as well as private portions (e.g., a residential Local Area Network (LAN)), or a combination thereof. The network 30 can be implemented using any one or more of a wide variety of conventional communications media including both wired and wireless media.

At any time within the 24 hour period, a user of the secure storage device 26 can play the song using any appropriate media player. For example, the user can couple the secure storage device 26 to the home entertainment media player host 28 via an audio input connection (input from the perspective of the home entertainment media player host 28). Before a song is played, the processor portion (e.g., processor portion 14) of the secure storage device 26 will utilize the real time clock (e.g., real time clock 24) to determine if the 24 hour period has expired. If the 24 hour period has not elapsed, the audio information will be transferred to the media player host 28 for rendering. If the 24 hour period has elapsed, the audio information will not be transferred to the media player host 28. In this exemplary scenario, the user listens to the music provided by the secure storage device 26 while she is getting ready to go out. When the user leaves her home, she can couple the secure storage device 26 to her portable media player 34 and continue listening to music provided by the secure storage device 26. The secure storage device 26 can be coupled to the portable media player 34 via a hard wired connection or via an rf connection (e.g., BLUETOOTH®), for example.

In an exemplary embodiment, the media provider host 32 can provide the media in encrypted form. Accordingly, the processing portion (e.g., processor portion 14) of the secure storage device 26 will decrypt the encrypted audio, utilizing the appropriate decryption key (or keys) and transfer the decrypted audio to the media player host 28 and/or the media player host 34.

Figure 4:
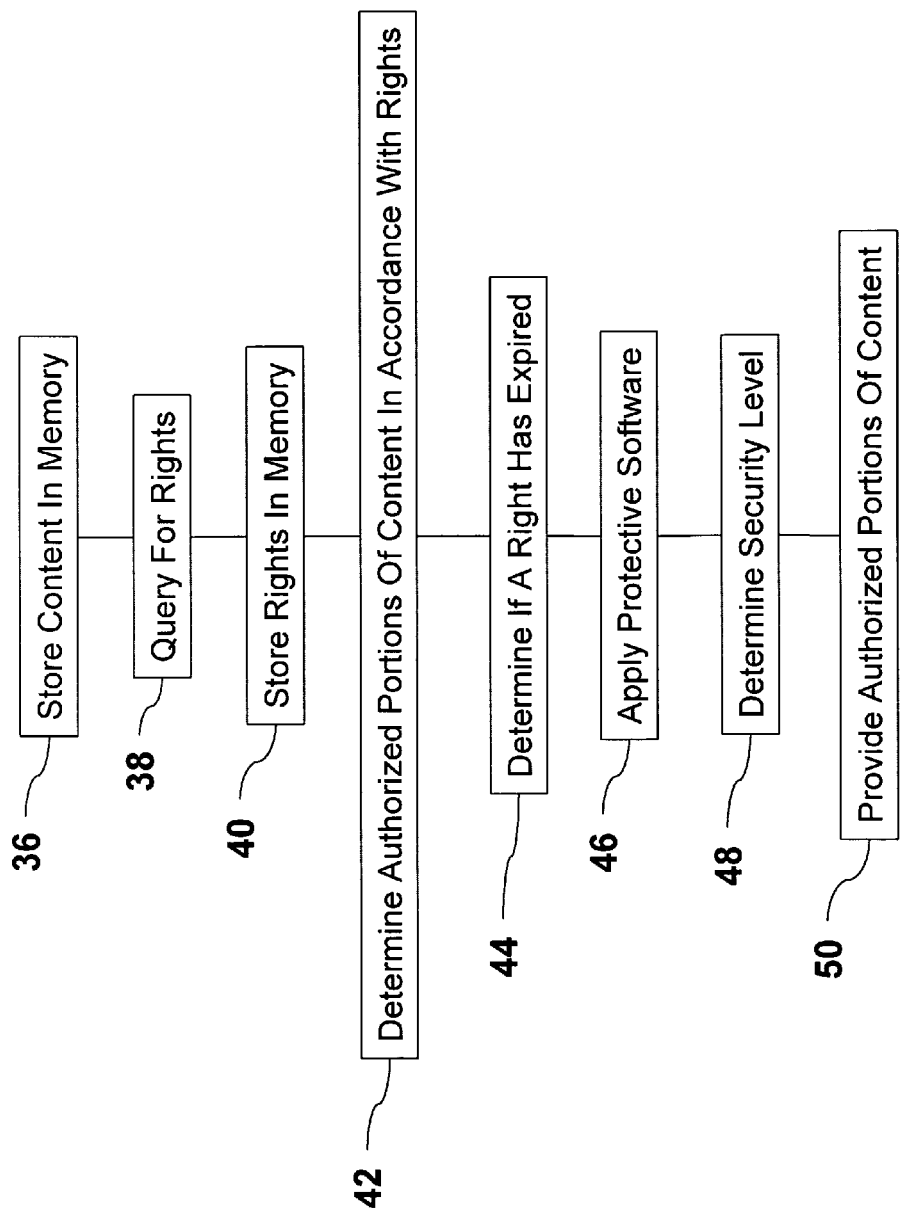
FIG. 4 is a flow diagram of an exemplary processing for managing memory in on a secure storage device.

FIG. 4 is a flow diagram of an exemplary processing for managing memory on a secure storage device. At step 36, content is stored in the memory (e.g., memory portion 16) or the secure storage device. The content stored in the secure storage device can be indicative of audio information (e.g., music, sound clips, ring tones), video information (e.g., movies, trailers, video clips), graphic information (e.g., pictures, photographs), multimedia information, data (e.g., computer data), or a combination thereof, for example. The content stored in the secure storage device can be provided by any appropriate source, such as a provider, a media player, another secure storage device, or a combination thereof, for example. Rights associated with the content also are stored (step 40) in the secure storage device. Rights associated with the content can be queried for at step 38. For example, if the secure storage device receives media indicative of an album of songs and a movie, the secure storage device can query the source for rights associated with each.

Authorized portions of the content stored in the secure storage device are determined at step 42. Authorized portions of content comprise portions of content that are allowed to be provided in accordance with the rights associated with the portion of the content. That is, if the rights associated with a portion of content allow that portion of content to be provided (to media player for example), that portion of content is authorized. In an exemplary embodiment, rights associated with a portion of content allow the portion to be provided to a specific host (or hosts). For example, rights associated with a portion (e.g., a song) of content can be authorized to be rendered only by media players with WINDOWS MEDIA PLAYER, for example.

It is determined, at step 44, if any rights have expired or are still in effect. If a right has expired, the portion of content associated with that right is no longer authorized to be provided. In an exemplary embodiment, a real time clock on the secure storage device is utilized to determine if rights have expired or are still in effect. If any protective software, such a virus protection or updates for example have been provided to the secure storage device, the protective software is applied at step 46. Protective software can be applied at any time. At step 48, it is determined if a security level is associated with any portions of content stored in the secure storage device. Various security levels allow various types and amounts of data to be provided by the secure storage device. For example, a media player can have a low security level associated with a particular portion of content stored in the secure storage device. When the media player requests a particular portion of content, such as a movie for example, the media player is authorized to receive a table of contents or thumbnail images of selected scenes of the movie. If the media player has a higher security level associated with the movie, the media player could be authorized to receive a trailer or selected scenes from the movie. If the media player has the highest security level associated with the particular portion of content (the movie), then the media player is authorized to receive the complete movie. Authorized portions of content are provided at step 50.

As described above, the secure storage device can be updated to counter threats, attacks, and malicious acts against the content. Updates can be in the form of virus protection software, updates to software native to the secure storage device, updates to the security and/or DRM software being executed by the secure storage device, or a combination thereof. Protective software can be provided by the provider of the content (e.g., media), by the intended recipient of the content (e.g., media player), or via an independent source (e.g., website), or a combination thereof.

The secure storage device also can query external sources, such as websites, intended recipients, other secure storage devices, or a combination thereof, for example, for information pertaining to the intended recipient's rights associated with the content. This information can include cryptographic keys, permissible times associated with associated rights, and/or security levels assigned to portions of the content and/or specific receiving hosts.

The various techniques described herein may be implemented in connection with hardware or software or, where appropriate, with a combination of both. Thus, the methods and apparatuses for a secure storage device or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for a secure storage device. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

The methods and apparatuses for a secure storage device also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for a secure storage device. When implemented on a general-purpose processor, the program code combines with the processor to provide a unique apparatus that operates to invoke the functionality for a secure storage device. Additionally, any storage techniques used in connection with a secure storage device can invariably be a combination of hardware and software.

While methods and apparatuses for a secure storage device have been described in connection with the illustrative embodiments of the various figures, it is to be understood that other similar embodiments may be used or modifications and additions may be made to the described embodiments for performing the same function for a secure storage device without deviating therefrom. Therefore, methods and apparatuses for a secure storage device should not be limited to any single embodiment, but rather should be construed in breadth and scope in accordance with the appended claims.

A secure storage device as described herein is capable of functioning as a secure host. That is, the secure storage device can be updated and can provide updates. The secure storage device provides a means to port content (e.g., media) from one host to another while maintaining the security of and rights associate with the content. The secure storage device also provides a means for managing digital rights associated with the content and enforcing host specific digital rights. For example, one host may have a 24 hour period rental right, and another host may have a 1 month rental period. In an exemplary embodiment, a user can participate, via the secure storage device, in a subscription service, wherein the user can choose from any of a number of movies, for example, over given period of time. Thus, the user could download a specific movie to the secure storage device and play the movie on the media player of his choice. The user can then, within the subscription period, download another movie and watch it on the media player of his choice. The secure storage device is capable of querying the intended recipient host to determine the current status of rights associated with content, and can provide content in accordance with current rights.

What is claimed:

1. A portable secure storage device comprising:
   a processor portion configured to:
      manage rights associated with content stored in a memory portion of said portable secure storage device;
      determine a configuration, including a content rendering configuration, of an external device; and
      determine, based on said configuration and in accordance with said rights, what portion, quality or form of said content is authorized to be provided, for rendering only, to said external device;
   an input/output portion configured to:
      receive said content and said rights;
      receive said configuration;
      provide authorized portions, quality or form of said content;

receive content for storage in said memory portion; and
receive information pertaining to said rights; and
said memory portion configured to:
store said content; and
store said rights.

2. A portable secure storage device memory in accordance with claim 1, said memory portion further comprising a non-removable hard disk drive memory.

3. A portable secure storage device memory in accordance with claim 1, memory portion comprising at least one of a 0.85 inch hard disk drive, a 1 inch hard disk drive, a 1.8 inch hard disk drive, a 2.5 inch hard disk drive, a 3.5 inch hard disk drive, and a flash memory.

4. A portable secure storage device in accordance with claim 1, said device further comprising a real time clock.

5. A portable secure storage device in accordance with claim 4, wherein said processor portion is configured to determine if a right has expired based on said real time clock.

6. A portable secure storage device in accordance with claim 1, wherein said input/output portion is configured to receive protective software to counter threats against said content and said processor portion is configured to execute protective software to protect said content.

7. A portable secure storage device in accordance with claim 1, said secure storage device comprising said processor portion configured to determine, based on said configuration, what portion, quality or form of said content is authorized to be copied from said memory portion to said external device in accordance with licensing rules specified in said rights.

8. A portable secure storage device in accordance with claim 1, said configuration including a security level configuration, wherein said input/output portion is configured to provide a first selected portion of said content for a first security level of said external device and a second selected portion of said content for a second security level of said external device.

9. A portable secure storage device in accordance with claim 1, wherein said content is indicative of at least one of audio information, video information, graphic information, and multimedia information.

10. A portable secure storage device in accordance with claim 1, wherein said input/output portion is capable of performing at least one of wireless communications and wired communications.

11. A portable secure storage device in accordance with claim 1, wherein said portable secure storage device is incapable of rendering content stored in said memory portion.

12. A method for managing content stored on a portable secure storage device, said method comprising:
storing, by said portable secure storage device, on said portable secure storage device said content and rights associated with said content;
determining, by said portable secure storage device, a configuration, including a content rendering configuration, of an external device;
determining, by said portable secure storage device, based on said configuration and in accordance with said rights, what portion, quality or form of said content is authorized to be provided, for rendering only, to said external device; and
providing, by said portable secure storage device, to said external device authorized portions, quality or form of said content.

13. A method in accordance with claim 12, said method further comprising storing said content on a non-removable hard disk drive memory contained within said portable secure storage device.

14. A method in accordance with claim 12, wherein said memory portion comprises at least one of a 0.85 inch hard disk drive, a 1 inch hard disk drive, a 1.8 inch hard disk drive, a 2.5 inch hard disk drive, a 3.5 inch hard disk drive, and a flash memory.

15. A method in accordance with claim 12, said method further comprising utilizing a real time clock contained within said portable secure storage device to determine if a right has expired.

16. A method in accordance with claim 12, said method further comprising:
receiving protective software to counter threats against said content; and
executing said protective software within said portable secure storage device to protect said content.

17. A method in accordance with claim 12, wherein said secure storage device functions as a license server, said method further comprising:
determining, based on said configuration, what portion, quality or form of said content is authorized to be copied from said portable secure storage device to said external device in accordance with licensing rules specified in said rights.

18. A method in accordance with claim 12, said configuration including a security level configuration, said method further comprising providing a first selected portion of said content for a first security level of said external device and a second selected portion of said content for a second security level of said external device.

19. A method in accordance with claim 12, wherein said content is indicative of at least one of audio information, video information, graphic information, and multimedia information.

20. A method in accordance with claim 12, wherein said portable secure storage device is incapable of rendering content stored in said portable secure storage device.

* * * * *